June 13, 1933.  G. A. LUTZ  1,913,714
FERRULE FOR ELECTRIC WELDING
Filed Nov. 30, 1929  2 Sheets-Sheet 2
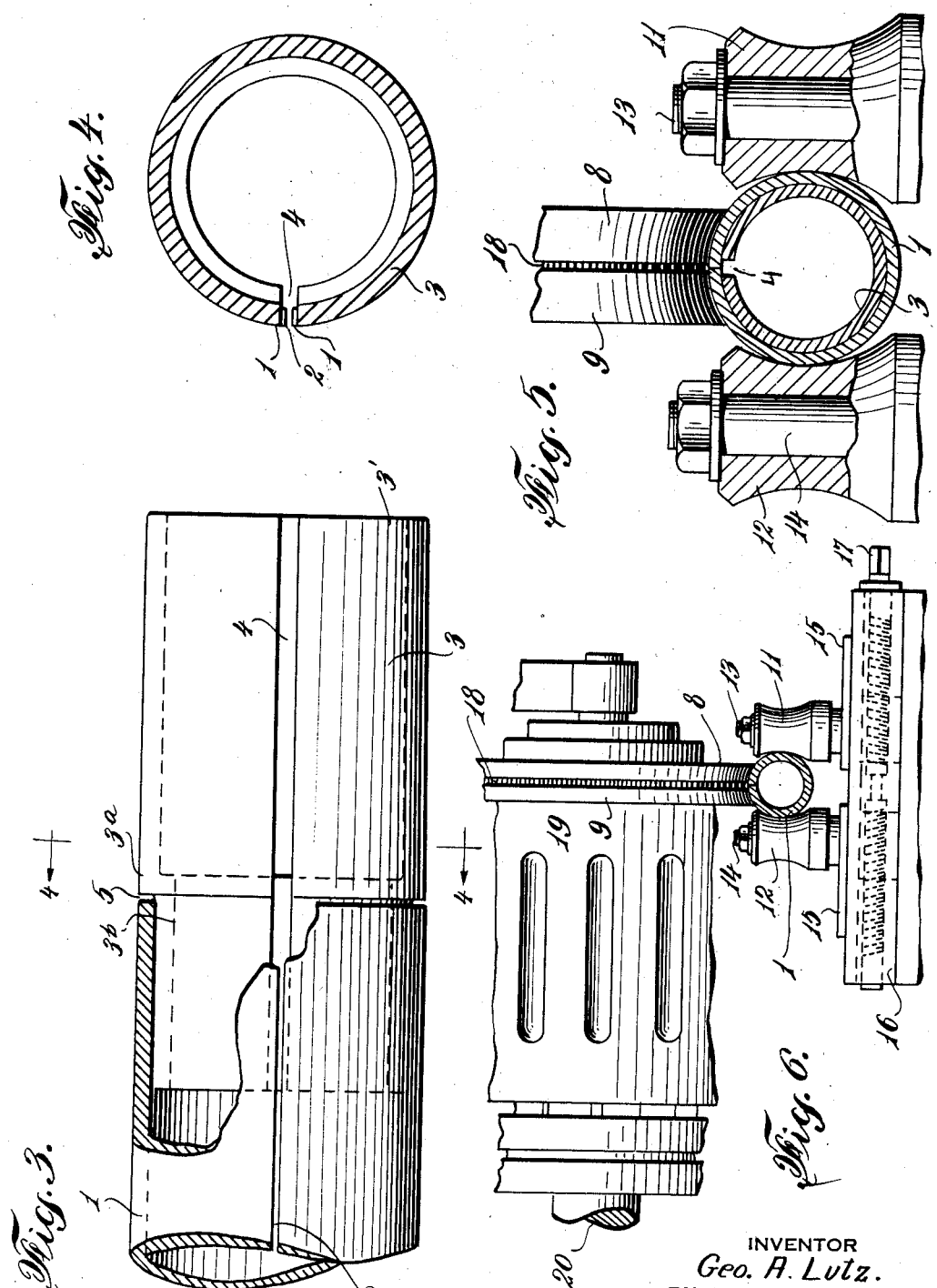
INVENTOR
Geo. A. Lutz.
BY
ATTORNEY Patented June 13, 1933

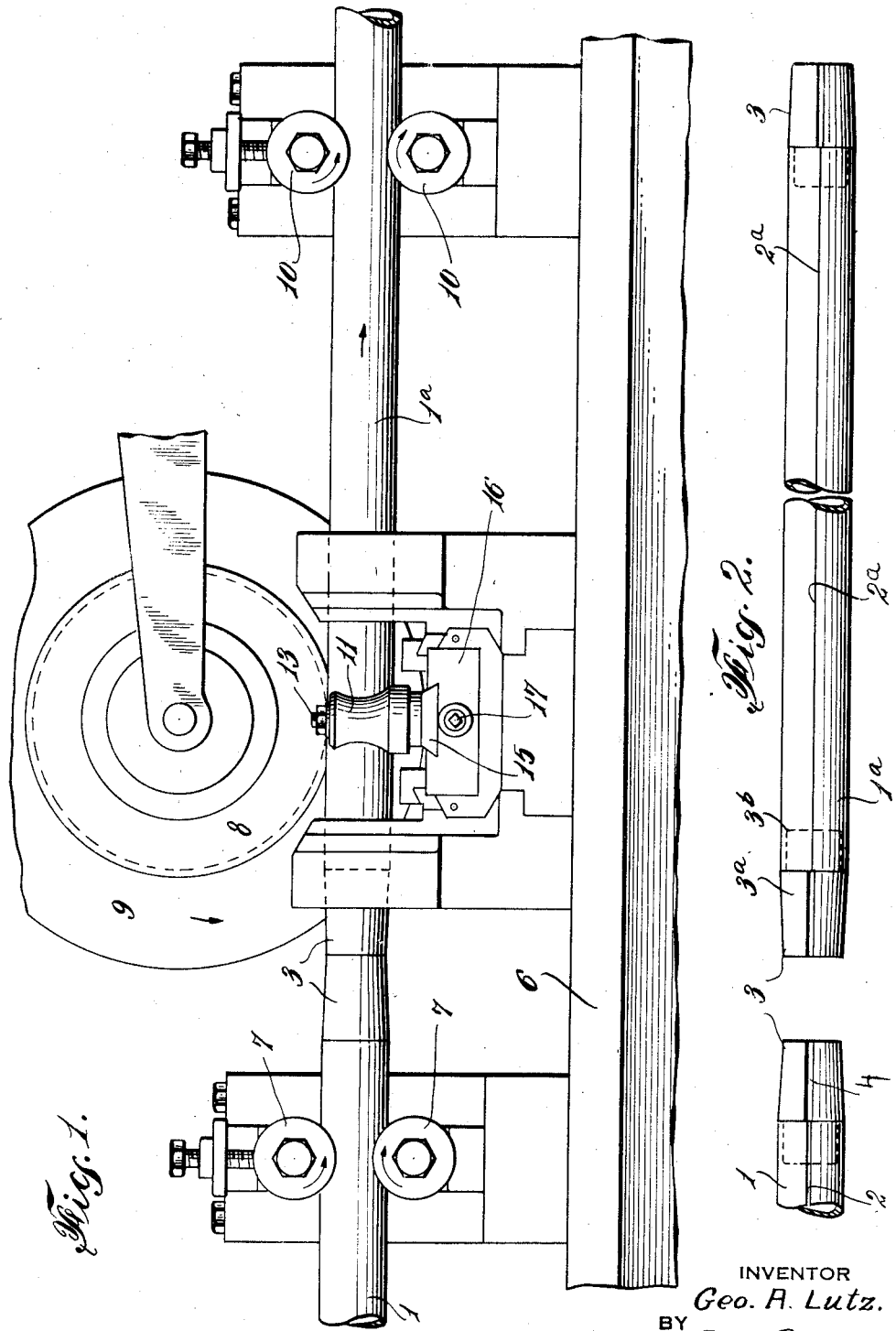

1,913,714

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

FERRULE FOR ELECTRIC WELDING

Application filed November 30, 1929. Serial No. 410,701.

In the electric welding of pipes and tubes the latter are usually forced or drawn through a pass between guiding rolls and electrodes, which pass must be of such an area that the edges of the pipe blank, at the seam to be welded, will engage to permit the electric current to flow across the seam to weld the edges of the latter together. It has been found in practice to be difficult to properly enter the pipe or tube between the pressure rolls and the electrodes at the pass because the edges of the seam of the pipe blank are not in contact when presented to the pass, hence the said blank is of greater diameter transversely than the pass and must immediately be squeezed by the rolls as it enters the pass in order to bring the edges of the seam in contact, and the entering blank injures the electrodes. In consequence of the foregoing a considerable length of the pipe or tube is not immediately welded at the electrodes, or the welding at that portion of the pipe or tube is poor and unsatisfactory, and that portion of the pipe or tube may have to be cut off and become waste.

The object of my invention is to provide means to cause a pipe or tube blank, whose seam is to be electrically welded, to be easily fed into the pass and in contact with the electrodes in such a way that the end of the pipe blank will be guided into the pass, in immediate and proper contact with the rolls and electrodes, without injury to the blank or the electrodes, so that the entering end of the blank will at once be properly squeezed or compressed to bring the edges of the seam of the blank into contact, whereby the electric current may immediately flow across the seam to at once begin the welding operation, thereby expediting the welding and saving waste of the pipe or tube.

In carrying out my invention I provide a ferrule or plug to be fitted at an end of the pipe or tube blank to be welded, which ferrule or plug has a portion to enter the blank and a portion to protrude outwardly from the blank, the ferrule having a longitudinal slot of such a width that its edges will not be caused to contact when the ferrule travels through the pass, to keep said edges from being welded together. The ferrule or plug is preferably tapered in the direction from the pipe or tube blank toward the outer end of the ferrule in order readily to enter the pass, and the ferrule is sufficiently pliable or elastic to enable it to be squeezed or compressed in the pass, whereby the ferrule will guide the pipe or tube blank to which it is attached into proper position in the pass to enable the rolls and the electrodes to at once properly contact with the advancing end of the blank, so that the latter may be fed smoothly into the pass.

Reference is to be had to the accompanying drawings forming part hereof, wherein Fig. 1 is a side elevation showing my improvement on pipes or tubes in an electric welding machine Fig. 2 is a side view of a pipe and blank showing my improved ferrules at the ends thereof;

Fig. 3 is an enlarged partly broken side view of a pipe blank and ferrule;

Fig. 4 is a section on line 4, 4, in Fig. 3;

Fig. 5 is a sectional detail view showing a pipe blank and ferrule in a pass, and Fig. 6 is a detail end view of the machine.

Similar numerals of reference indicate corresponding parts in the several views.

At 1 is a pipe or tube blank to be welded, which may be of any well known character, having an open seam at 2, the edges of which are to be welded together. Such pipe or tube blanks are usually formed from sheet metal so that the seams are more or less open before the blank is pushed into a pass for welding. At 3 is my improved ferrule or plug, which is tubular and to be made of suitable metal. The ferrule or plug is provided with a longitudinal slot, shown open through both ends of the ferrule, so that the ferrule may be squeezed or compressed circumferentially to reduce its diameter. Said slot 4 is sufficiently wide to prevent its edges from contacting when the ferrule travels through a pass in a welding machine. The ferrule has two main portions, of different transverse diameters, providing an abutment or shoulder 5 at the inner end of the portion 3a, adjacent to the inner end of the portion 3b, (Fig. 3). The outer diameter of the portion 3a of the ferrule, adjacent to the abutment 5, is substantially equal to the diameter of the pipe blank, and the ferrule preferably tapers toward its outer end 3' to readily enter a pass in a welding machine. The portion 3b of the ferrule is of such a diameter as to fit snugly within the pipe blank, in such a way that the abutment 5 of the ferrule may abut against the end of the blank when pushed into the pass of the machine. When the ferrule is attached to the pipe blank the slot 4 of the ferrule will preferably coincide with the open seam 2 of the blank, and said slot is wider than said seam, (Fig. 3), so that when the part of the pipe blank surrounding the portion 3b of the ferrule is in the pass, and the edges of the seam 2 are forced into contact in the pass, the edges of the slot 4 will not engage so that they will not be welded, (Fig. 5).

The pipe or tube blank may be welded in any suitable electric welding machine. I have illustrated a portion of a known type of electric welding machine in which my improved ferrule is adapted to be used. Upon a frame or bed 6 are mounted feeding rolls 7 for the pipe or tube blank 1, on one side of the electrodes 8 and 9, and on the other side of the electrodes are pulling rolls 10. The said rolls may be driven in any known or desired way. At 11 and 12 are pressure rolls, spaced apart to form a pass for the pipe or tube blank and to close the seam of the blank at a point adjacent to the points of contact of the electrodes with the blank, (Figs. 5 and 6). The rolls 11 and 12 are of suitably curved shape to guide the pipe or tube blank and resist the pressure of the electrodes. Said rolls are shown journaled upon studs 13 and 14, which are laterally adjustable to regulate the pressure of the said rolls upon the blank. Said studs are carried by slide blocks 15 guided in ways to be operated by right and left screw 17 in a well known way, for adjusting the rolls 11 and 12 and retaining them in set positions.

The electrodes I have illustrated are of the annular secondary terminal rotary type, insulated from each other, as by insulation at 18, or by an air space, which electrodes are in electrical communication with the secondary 19 carried by shaft 20 of a rotary electric transformer of a well known type, such as set forth in Letters Patent to me No. 1,594,891, issued August 3, 1926. As the pipe or tube blank is fed through the machine the electrodes rotate with the transformer secondary and in contact with the blank, whereby electric current flows between the electrodes and across the seam of the blank to weld the latter, in a well known way.

When the pipe or tube blank is to be welded my improved ferrule is inserted in the end of the blank, substantially as shown in Fig. 3, (with, preferably, a ferrule at each end of the blank), with the tapering portion of the ferrule protruding from the blank. When the blank is fed toward the pass the protruding portion of the ferrule will encounter the rolls 11, 12 and the electrodes, and will enter the pass with freedom, traveling therethrough readily and guiding the blank to position in the pass. The ferrule will be gradually compressed in the pass by the rolls and electrodes so that when the end of the blank reaches the latter it will smoothly enter the pass, and the outer end of the blank will be properly compressed to cause contact of the edges of the seam at $2^a$ at once, so that the welding current may begin to flow across the seam in a proper manner, at or close to the end of the blank. Due to the slot 4 in the ferrule the blank may be properly compressed or squeezed in the pass, since the edges of said slot do not resist compression of the blank. The ferrule leads the blank smoothly at its end to the electrodes so that the blank will not injure the electrodes by abruptly or forcibly engaging the latter. By having a ferrule at each end of each blank, a blank advancing from feed rolls 7 may, through its ferrule, push against the ferrule at the adjacent end of the blank being welded, and the advancing ferrule will be guided to the pass by contact with the retreating ferrule on the pipe or tube 1a being welded, (Fig. 1).

By means of my improvement the electric welding of pipes and tubes will be facilitated, electric current will be conserved and sparking at entering ends of the blanks in the pass will be reduced, and waste of pipes or tubes at the ends that enter the pass will be saved, thereby effecting economies in the class of welding described.

My invention is of advantage in welding pipes or tubes of definite lengths as distinguished from the welding of the edges of a continuous strip of metal that is formed into tubular shape and fed through a pass to be cut off into lengths after welding.

I use the term "ferrule" in a broad sense to mean a device fitted at an end of a pipe or tube blank to guide the latter into a pass of an appropriate welding machine.

Having now described my invention what I claim is:—

1. A tubular contractible ferrule for a pipe blank having a portion at one end to enter the blank and having a portion at the other end of greater diameter than the diameter of the first named portion, the second named portion tapering uniformly from its inner end to the outer end thereof, said ferrule having a longitudinal slot extending throughout its length.

2. A ferrule as set forth in claim 1 provided with an abutment at the inner end of the second named portion.

3. The combination of a contractible tubular metal blank having a longitudinal slot, with a contractible tubular longitudinally slotted ferrule having a portion located within an end of said tubular blank, said ferrule having another portion extending beyond said end of the blank, the last named portion being of greater diameter than the diameter of the first named portion adjacent to the blank, the edges of the slots of the blank and the ferrule being spaced apart to permit the blank and the first named portion of the ferrule to be simultaneously compressed.

4. The combination of a tubular metal blank and ferrule as set forth in claim 3 in which the width of the slot in the ferrule is greater than the width of the slot in the blank to prevent the edges of the slot of the ferrule from contacting when the edges of the slot in the blank engage.

5. The combination of a tubular metal blank and ferrule as set forth in claim 3 in which the second named portion of the ferrule tapers uniformly from its inner end to its outer end.

6. The combination of a tubular metal blank and ferrule as set forth in claim 3 in which the ferrule is provided with an abutment at the inner end of the second named portion, the last named portion tapering uniformly from said abutment to its outer end.

GEORGE A. LUTZ.